US005682969A

United States Patent [19]
Ling

[11] Patent Number: 5,682,969
[45] Date of Patent: Nov. 4, 1997

[54] RESILIENT INPUT TO A LOCKUP CLUTCH

[75] Inventor: Ching-Chung Ling, Plymouth, Mich.

[73] Assignee: Ford Global Technologies, Inc., Dearborn, Mich.

[21] Appl. No.: 538,880

[22] Filed: Oct. 4, 1995

[51] Int. Cl.[6] .................................................. F16H 45/02
[52] U.S. Cl. ................................... 192/3.29; 192/212
[58] Field of Search .......................... 192/3.3, 3.29, 192/212

[56] References Cited

U.S. PATENT DOCUMENTS

| | | | |
|---|---|---|---|
| 2,943,516 | 7/1960 | Herndon | 192/3.3 X |
| 3,541,893 | 11/1970 | Dyke et al. | 192/3.3 X |
| 4,033,436 | 7/1977 | Hoetger et al. | |
| 4,090,417 | 5/1978 | Burcz et al. | |
| 4,173,270 | 11/1979 | Croswhite et al. | |
| 4,785,924 | 11/1988 | Jackel | |
| 4,926,988 | 5/1990 | Kundermann | |
| 4,969,543 | 11/1990 | Macdonald | |
| 5,195,621 | 3/1993 | Dull et al. | 192/3.3 X |
| 5,203,835 | 4/1993 | Kohno et al. | 192/3.29 |
| 5,209,330 | 5/1993 | Macdonald | |
| 5,211,270 | 5/1993 | Tamura et al. | |
| 5,241,820 | 9/1993 | Fukunaga et al. | |
| 5,348,127 | 9/1994 | Murata et al. | 192/3.3 |
| 5,377,796 | 1/1995 | Friedmann et al. | 192/3.3 X |
| 5,383,540 | 1/1995 | Macdonald | |

FOREIGN PATENT DOCUMENTS

| | | | |
|---|---|---|---|
| 2690214 | 10/1993 | France | 192/3.29 |
| 2706967 | 12/1994 | France | 192/3.29 |
| 2 123 906 | 2/1984 | United Kingdom | |

*Primary Examiner*—Rodney H. Bonck
*Attorney, Agent, or Firm*—James J. Dottavio

[57] ABSTRACT

An hydrokinetic torque converter (10) which has a clutch for driveably releasing and locking the cover (12) and turbine (26). The clutch is comprised of a first annular member (74) having a first friction surface (80) driveably connected to the turbine (26) and a second annular member (60) having a second friction surface (61) resiliently connected (69) to the cover (12). The second friction surface (61) frictionally engages the first friction surface (80) to provide a driving engagement therebetween.

19 Claims, 2 Drawing Sheets

RESILIENT INPUT TO A LOCKUP CLUTCH

BACKGROUND OF THE INVENTION

1. Field of the Invention

This invention relates to the field of automatic transmission torque converters, which hydrodynamically connect an impeller to a turbine. The invention pertains particularly to a bypass clutch having a resilient connection between the clutch piston and impeller cover.

2. Description of the Prior Art

U.S. Pat. No. 5,209,330, assigned to the assignee of the present invention, includes a hydrokinetic torque converter with an impeller housing and a bypass clutch located within the impeller housing having dual friction plates. The impeller cover has welded to it a clutch plate, which is connected by a splined connection to a clutch piston rotatably supported on a turbine rotor. A drive ring carries friction surfaces adjacent the clutch piston and clutch plate. The drive ring extends axially into engagement with a helical spring carried in a damper assembly arranged in series with the damper between the impeller cover and the input shaft of the transmissions.

U.S. Pat. No. 4,926,988 issued May 22, 1990 to Kundermann, shows several means to driveably engage a piston with an impeller cover. The Figure uses a splined connection 35 from the impeller cover to a hub disc 36 through leaf springs 37 to a piston 24. FIG. 2 shows a splined connection from the impeller cover to a hub disc 46 to the piston 25 through a riveted connection 41. FIGS. 3-5 show variations of pins or tabs 49 riveted 42 to a piston 26, the pins projecting through an aperture 48 on a weldment 47 on the impeller cover create a driveable connection therebetween.

The prior art connections between the impeller cover and piston have inherent movement between the driveable connection. In splined, pinned, or tabbed connections, clearance is required between the mating components to permit axial movement therebetween. This clearance results in relative rotational movement before the impeller cover driveably engages the piston, producing torque spikes, vibrations, and rattles. The leaf spring connection shown in FIG. 1 of Kundermann results in similar problems, especially in coasting conditions, where the impeller cover may slow more quickly than the piston and the piston may lose contact with the leaf spring; when a torque is reapplied, the impeller cover may produce a torque spike or the springs may rattle when unloaded. It would therefore be desirable to have a bypass clutch design which reduces torque spikes, dampens relative radial movement of the piston to the cover and reduces vibrations

SUMMARY OF THE INVENTION

In a conventional design, space is provided between the impeller cover and piston to allow for axial movement therebetween, but no effective provision is made to reduce the torque spikes and vibrations produced by the radial movement caused thereby. It is an object of the present invention to provide means for reducing torque spikes, dampening relative radial movement of the piston to the cover and reducing vibrations.

A device, according to the present invention, includes an hydrokinetic torque converter with a clutch for driveably releasing and locking the cover and turbine. The clutch is comprised of a first annular member having a first friction surface driveably connected to the turbine and a second annular member having a second friction surface resiliently connected to the cover. The second friction surface frictionally engages the first friction surface to provide a driving engagement between the cover and turbine. The resilient connection may include a pretensioned lead, such that when the impeller cover rotates, a force is immediately transferred through the springs to the piston, thereby reducing lash to reduce or eliminate roll-over or rattling noise. Additionally, the resilient connection acts as part of a damper when the clutch is in the unlocked condition, thereby reducing the vibrations in the clutch assembly.

DESCRIPTION OF THE PREFERRED EMBODIMENT

Figure 1:
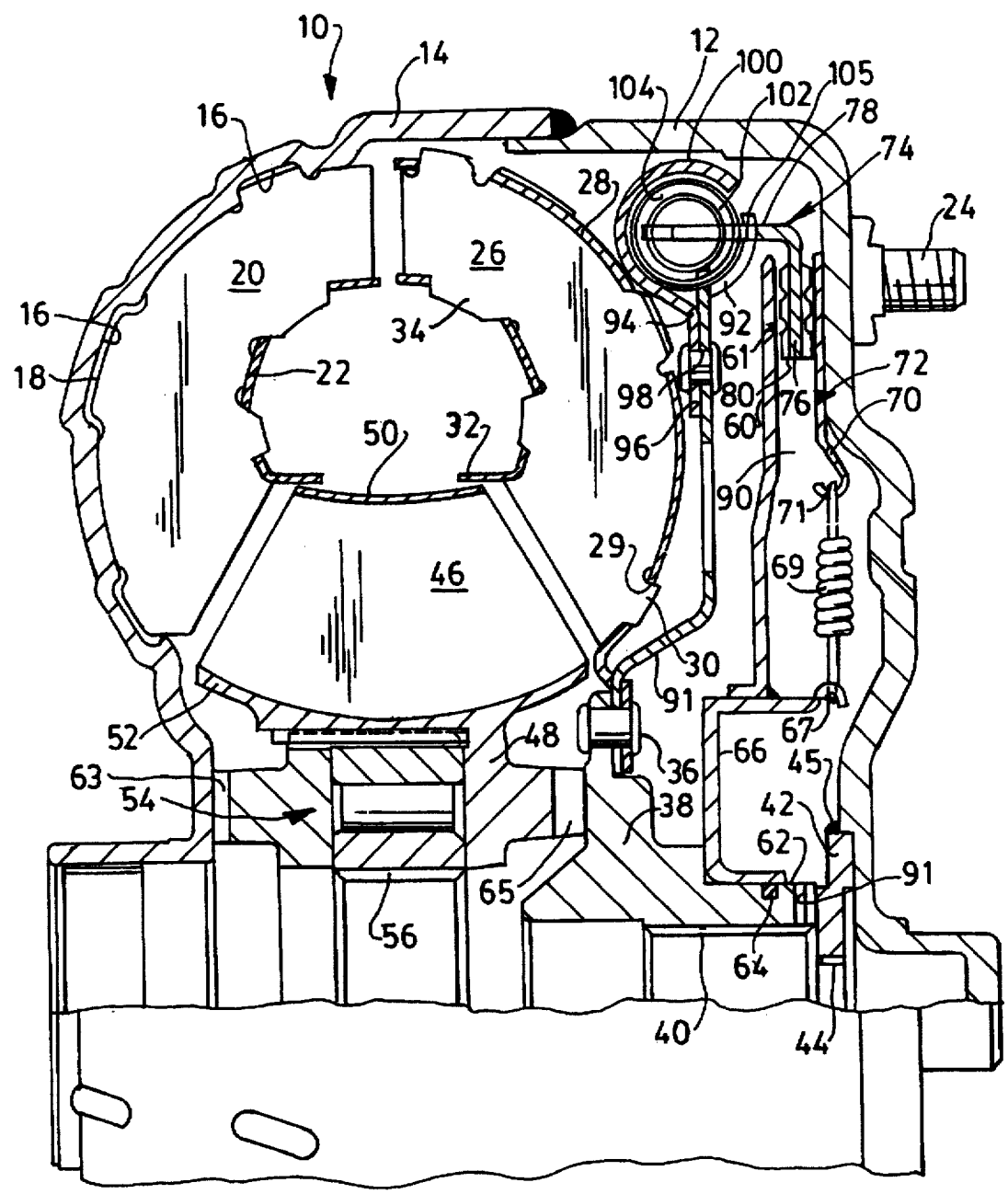
FIG. 1 is a side view of a torque converter, partially in cross section, showing a bypass clutch and clamper according to the invention.

Referring to the FIG. 1, a torque converter 10 includes an impeller cover 12, which is welded to an impeller shell 14 having recesses 16, which receive tabs 18 located on the outer surface of impeller blades 20. The impeller blades are retained between shell 14 and an inner impeller shroud 22. The impeller cover 12 supports a circular pattern of threaded studs 24 to which a flywheel, rotatably supported on the engine crankshaft, is bolted, thereby driveably connecting the cover 12 to an engine (not shown).

Turbine blades 26 are spaced mutually about the axis of rotation and are located with respect to the impeller blades 20 so that a toroidal fluid flow within the torque converter 10 exits the impeller 20 and enters the turbine at the radially outer area and leaves the turbine at the radially inner area. The outer periphery of the turbine blades 26 is fixed mechanically by brazing or welding to a turbine shell 28, which has openings 29 that receive tabs 30 formed on the turbine blades 26. The inner periphery of the turbine blades 26 is connected to an inner turbine shroud 32 by locating tabs 34 within slots formed in shroud 32 and bending the tabs 34 over the inner surface of the shroud 32, thereby fixing the position of the blades 26 between shell 28 and shroud 32. Turbine shell 28 is secured by rivets 36 to turbine hub 38 having an internally splined surface 40 adapted to engage an externally splined surface on a transmission input shaft. Disc 42, welded at 45 to the impeller cover, includes a splined surface 44.

Located between the flow exit section of the turbine and the flow entrance section of the impeller is a stator assembly comprising stator blades 46, spaced mutually around the axis of rotation, a hub 48, supporting blades 46, an inner shroud 50 connecting the radially inner tips of the blades and an outer shroud 52 connecting the radially inner ends of the stator blades. An overrunning brake 54, fixed by splines 56 to a stationary sleeve shaft, provides one-way braking between the stator blades 46 and the sleeve shaft.

The cover 12 transmits torque from the cover 12 to the turbine through a bypass clutch. In the preferred embodiment, the clutch comprises a piston 60 having a second friction surface 61 facing the cover, the piston 60 being driveably connected to the cover 12 through a plurality of springs 69 as described below, and a third friction surface on the inner surface of the cover 12 facing the second friction surface 61 on the piston 60. In the preferred embodiment the third friction surface is provided on an annular ring (clutch plate) 70 welded to the cover 12 by a spot weld 72, thereby providing a seal against the passage of hydraulic fluid between the axially outer surface of clutch plate 70 and the adjacent inner surface of the cover 12.

The piston 60 in the preferred embodiment is a two-piece construction. The radially outer portion of the piston 60 includes the second friction surface 61 and is welded to the radially inner portion 66 of the piston 60, which is supported by hub 38. The radially inner portion 66 of the piston 60 includes a plurality of tabs 67, each of which is adapted to mount a first end of a radially extending coil spring 69 to provide a resilient connection between the cover 12 and piston 60. The clutch plate 70, attached to the cover 12, includes a plurality of tabs 71 which support the second end of each of the springs 69. The springs 69 are equally spaced circumferentially about the perimeter of the clutch. The number of springs required is application specific and depends upon the size and strength of the springs, the amount of torque transmitted and the package space available. The springs 69 may be mounted in a free state or pretensioned state. The pretensioned state is obtained by mounting the spring in tension between tabs 67, 71 when the torque converter is being assembled, so the springs remain in tension when the clutch is not engaged. The springs 69 are held between the clutch plate 70 and piston 60, so when the cover 12 is rotated, the springs transmit torque to the piston, thereby causing the piston to rotate without appreciable delay when the springs are in tension. Additionally, when the cover 12 slows, the pretensioned springs 69 of the preferred embodiment continue to be in tension, so when a driving force is transmitted through the cover 12, the piston 60 will again receive a driving torque.

In the preferred embodiment, when the cover 12 is rotating, the rotational force transmitted by the cover 12 is delivered to the piston 60 through the springs 69. The force causes the springs 69 to elongate and the initial energy from this force will be stored by the springs 69 during elongation, thereby absorbing torque spikes transmitted to the piston 60, consequently reducing vibrations and surges experienced by the piston 60. The energy absorbed by the springs 69 is dampened when transmitted to the piston through the frictional engagement with the clutch plate 70. The energy may be dampened alternatively or cumulatively by the fluid contained within the torque converter adjacent the piston 60. The springs 69 may be manufactured to have a nonlinear spring rate at various lengths as is well known in the art, such as by varying coil sizes along the length of the spring, thus changing the spring characteristics of the clutch as it is applied.

When the springs 69 are pretensioned as in the preferred embodiment, the initial application of torque to the cover 12 will promptly be transferred to the clutch 60, reducing the lash in the clutch, thereby further reducing rattles and vibrations. A variation of the preferred embodiment includes a spring positioned horizontal to that which is shown in the FIG. 1, wherein the spring would extend coaxially with the hub 38, but the radial orientation shown in the FIG. 1 is preferred. Alternatively, a compression spring could be employed between the cover 12 and piston 60 to provide the resilient connection.

The springs 69 may be mounted to the clutch plate 70 and piston 60 in any known manner, but the preferred embodiment utilizes a hooked end at each end or the spring 69. The flange 67 on the piston 60 and flange 71 on the clutch plate 70 have a "j" or hooked shape as shown in the FIG. 1. The ends of the flanges 67, 71 or springs 69 may be crimped to retain the springs 69. Alternatively, the flanges 67, 71 could have a slot formed to accept an end of the spring 69.

In the preferred embodiment, the piston 60 is slidably mounted in an axially directed surface 62 formed on turbine hub 38 and sealed against the passage of hydraulic fluid by an O-ring 64, located in a recess formed in surface 62. Axial movement of piston 60 is limited by a shoulder formed on piston hub 38, as shown in the FIG. 1. A second clutch plate driveably connects cover 12 to the rotor of a hydraulic pump, the pressure source from which the torque converter and automatic transmission are pressurized, controlled and actuated. The torque converter is supplied with fluid through passage 63; fluid returns to sump from the torque converter through passage 65.

Figure 2:
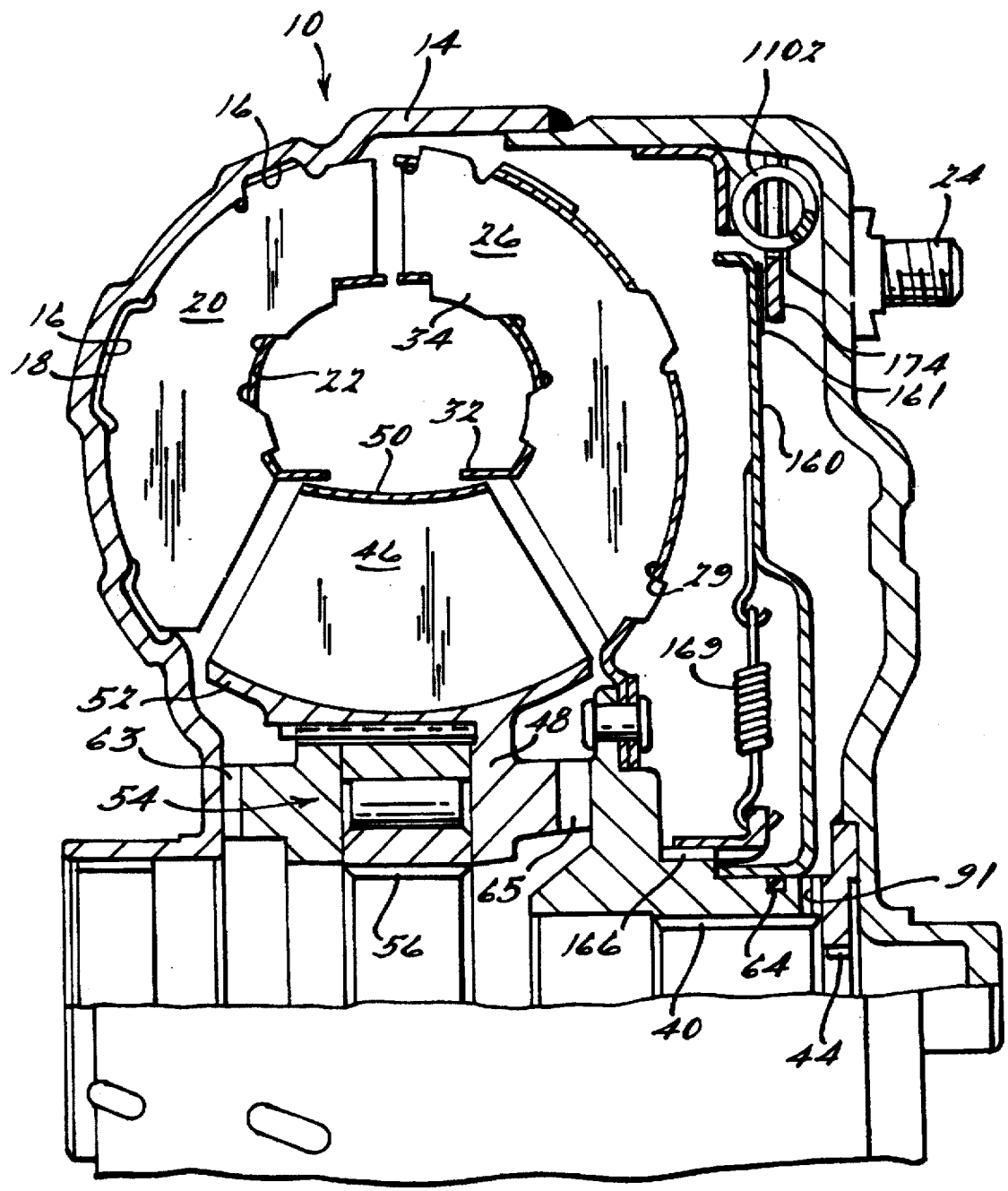
FIG. 2 is a view similar to FIG. 1 but of a second embodiment according to the invention.

In an alternate embodiment as shown in FIG. 2, the piston 160 is driveably engaged with the turbine, through a splined connection to the turbine hub as shown in U.S. Pat. No. 4,969,543 to Macdonald ('543), assigned to the assignee of the present invention, which is incorporated herein for the relevant teachings therein. Alternatively, the piston could be engaged with the hub by any other means as generally known in the art to provide for axial movement between the piston and hub. In this embodiment, the piston has a friction surface 161 facing the cover, and the cover carries an annular plate 174 which has a friction surface facing the friction surface on the piston. The annular plate is driveably connected to the cover with a resilient connection 1102 as described in the preferred embodiment. The torque path in a such a torque converter bypass clutch flows from the cover through the resilient connection 1102 to the annular plate 174, through the frictional engagement of the annular plate 174 to the piston 160, to the piston 160, through the turbine.

As shown in the FIG. 1, in the preferred embodiment, first friction surfaces 80 are provided on a drive ring 74 carried by the turbine 26. The first friction surfaces face the adjacent second and third friction surfaces on the piston 60 and shell 12. The drive ring 74 includes a radial leg 76 located between the inner face of clutch plate 70 and the outer face of piston 60, and six axial legs 78, spaced mutually angularly about the axis of rotation and directed from leg 76 toward the turbine. The surfaces of leg 76 that face plate 70 and piston 60 carry friction material 80, commonly referred to as "paper face " material, which is bonded to axially opposite radial surfaces of drive ring 74 by a bonding technique described by Frosbie, Milek and Smith in SAE Design practices, Volume 5, (1962) or any means known in the art. The clutch may include one or more friction surfaces engaged by differential pressure across the piston 60, and may include multiple radial legs 76 carried on the drive ring 74. In this way, the torque capacity of the clutch can be adjusted easily to match engine torque.

As described in U.S. Pat. No. 5,209,330 ('330 patent), assigned to the assignee of the present invention, and which is incorporated herein for its relevant teachings, the friction material 80 has formed two concentric annular grooves which can be machined by turning or formed by pressing a die on the face of the plate during formation of the disc as the friction material is pressure bonded to the steel drive ring 74. The friction material 80 is formed also with two sets of radial grooves, members of each radial groove set spaced at 90° intervals from other members of the set and at 45° intervals from members of the other set. Radial grooves do not communicate with the radially outer region but they do communicate with the radially inner region of the drive ring 74. They also interconnect each of the annular grooves. Radial grooves, which communicate with the radially outer region, do not communicate with the radially inner region. Fluid in the torus cavity of the torque converter has a pressure that is higher than pressure in chamber 90, located between friction plate 70 and piston 60. Therefore, hydraulic fluid tends to flow radially inward through radial outer grooves where it is transferred to the circumferential or annular grooves. The fluid then travels circumferentially to the adjacent radial grooves, from which the fluid is transferred to the radially inward region of the pressure chamber 90, thereby cooling the clutch.

The turbine shell 28 and a torque converter damper support 91 are joined to a radially extending flange of turbine hub 38 at a riveted connection 36. At the radially outer end of support 91, several arcuate flanges 92, spaced angularly about the axis at 60° intervals, are formed. A spring retainer ring 94 includes a radially inwardly extending web 96, riveted to support plate 91 at angularly spaced locations 98, and an arcuate flange 100 substantially complimentary to flange 92 of the support plate 91. Flanges 92 and 102 define between them a substantially circular tubular cavity, in which are located six angularly spaced, helically-coiled damper springs 102. At six equally spaced angular locations spaced mutually about the axis of rotation, flange 100 of the retainer ring is formed with a local bead extending approximately 16.4° between radially directed relief recesses 106 that permit formation of bead 104 in the arcuate flange 100. Similar relief slots 108, formed in the support 91, permit arcuate flanges 92 to extend outwardly from the planar radially directed web of the support ring and the radially outer end of support plate 91 to extend into the spring pockets over the same intervals and lengths as the local beads 104.

Due to the modular form inherent in the damper design, the number of springs 102 can vary with kinematic requirements without changing the principle of operation. The damper springs 102 are located at the radially outermost location within the impeller cover 12, thereby minimizing the damper-spring force needed to attenuate torsional vibration. Because the spring pockets closely conform to the outer surface of the coiled springs 102, as the springs 102 compress they move in contact on the inner surface of the pockets, which are hardened by heat treatment to withstand wear due to this. The resulting frictional contact produces coulomb damping in parallel with the spring force between the drive ring 74 and the turbine. When the clutch is engaged, the drive ring 74 is driveably connected to the impeller cover 12 and engine; therefore, the parallel arrangement of dampers and springs is active between the engine and turbine.

Drive ring 74 is supported on several arcuate surfaces 105 that coincide with the angularly spaced beads 104 and the radial ends of the support plate 91. Surfaces 105 guide the drive ring 74 as it moves axially toward clutch plate 70 due to contact with the piston 60 and away from the clutch plate as pressure within control chamber 90 falls in relation to pressure on the axially opposite side of the piston 60. Contact between the arcuate flanges 92 and the drive ring 74 limits the extent to which the springs 102 are compressed. Contact between the beads 104 and radial ends of the support plate 91 limit the extent to which the springs 102 can expand.

Chamber 90, defined by piston 60, cover 12, clutch plate 70 and the friction material on drive ring 74, is a control pressure chamber, which communicates with the control pressure source in a matter described in U.S. Pat. No. 4,633,738, which is assigned to the assignor of this invention. By controlling pressure in chamber 90, a pressure differential across piston 60 can be controlled. The pressure in the torus flow cavity on the left-hand side of piston 60 causes the friction surfaces on clutch plate 70 and piston 60 to become frictionally engaged with the friction material 80 on the inner and outer axial surfaces of radially extending leg 76 of drive ring 74. By appropriately modulating the pressure in chamber 90, controlled slipping will occur between the drive ring 74 and the cover 12 and piston 60, whereby torque fluctuation developed in the driveline due to engine torque perturbations and other torque transmitting irregularities can be absorbed.

When pressure in chamber 90 is less than pressure in the torus cavity, piston 60 is forced rightward against the drive, and the drive ring 74 is carried rightward into contact with clutch plate 70. The cover 12, clutch plate 70 and piston 60 turn at the speed of the engine. The drive ring 74 is connected through the damper assembly resiliently through the damper springs to support 91, and via the attachment at rivets 36 to the torus rotor, and through hub 38 to the transmission input shaft. The frictional clutch, including clutch plate 70, thereby provides driving engagement between the annular plate carried by the cover 12 and piston 60, through the piston 60, through the piston 60, to the turbine 26.

Although the preferred embodiment of the present invention has been disclosed, various changes and modifications may be made without departing from the scope of the invention as set forth in the appended claims.

What is claimed is:

1. In an hydrokinetic torque converter that includes a cover, an impeller drivably connected to the cover and a turbine, a clutch for drivably releasing and locking the impeller and turbine, comprising:

a piston slidably mounted on the turbine having a first friction surface;

a tension spring having first and second ends connected at said first end to said cover and at said second end to said piston, creating a resilient connection therebetween;

a second friction surface carried on the cover, facing the first friction surface; and passage means for alternately pressurizing and venting a first space located between the cover and the piston and a second space located between the piston and the turbine.

2. The clutch of claim 1, wherein the piston comprises an inner portion rotatably supported by the turbine and an outer portion fixedly supported against rotation with respect to said inner portion by said inner portion, said outer portion having the first friction surface at a radially outer portion thereof and said inner portion is connected to the first end of the spring.

3. The clutch of claim 1 further comprising:

said cover having an axis of rotation and the spring oriented substantially perpendicular to said axis of rotation.

4. The clutch of claim 3 further comprising:

a drive ring fixed to the turbine, having a friction disc with third and fourth friction surfaces located between the first and second friction surfaces; and wherein a surface on the group consisting of the drive ring, piston and cover includes friction material bonded to the surface and extending between radially inner and outer portions thereof, said friction material having radially spaced annular grooves connected by first radially directed grooves that communicate with the radially inner region of said the friction material and second radially directed grooves that communicate with the radially outer region of said friction material.

5. In an hydrokinetic torque converter that includes a cover having an axis of rotation, an impeller driveably connected to the cover and a turbine located between the cover and the impeller, a clutch for driveably releasing and locking the cover and turbine, comprising:

a piston slidably mounted on the turbine, sealed on the turbine against passage of fluid, and having a second friction surface;

a clutch disc welded to the cover, having a third friction facing said second friction surface;

a spring positioned between said cover and said piston, creating a resilient connection therebetween;

a drive ring fixed to the turbine, having a friction disc located between the second and third friction surfaces;

passage means for alternately pressurizing and venting a first space located between the cover and the piston and a second space located between the piston and the turbine; and damper means driveably connected to the turbine and drive ring for absorbing and dissipating torsional vibrations.

6. The clutch of claim 5 further comprising:

the piston having a first flange;

the clutch disc having a second flange; and the spring mounted in tension substantially perpendicular to the axis of rotation, having a first end supported by the second flange and a second end driveably connected to said first flange.

7. The clutch of claim 6 further comprising:

a friction surface on the group consisting of the drive ring, piston and cover including friction material bonded to said friction surface and extending between radially inner and outer portions thereof, said friction material having radially spaced annular grooves connected by first radially directed grooves that communicate with the radially inner region of said friction material and second radially directed grooves that communicate with the radially outer region of said friction material; and the piston having an inner portion rotatably supported by the turbine and an outer portion fixedly supported against rotation by said inner portion, said outer portion having a first friction surface at a radially outer portion thereof.

8. In an hydrokinetic torque converter that includes a cover having a first friction surface, an impeller drivably connected to the cover and a turbine, a clutch for drivably releasing and locking the cover and turbine, comprising:

an annular piston drivably connected to the cover having a second friction surface, an annular ring drivably connected to the turbine having a third and a fourth friction surface provided parallel the first and second friction surfaces, respectively, wherein said third and fourth friction surfaces are engageable with the first and second friction surfaces to provide a driving engagement therebetween; and a spring having first and second ends positioned between said cover and piston to resiliently connect said piston and said cover, said cover connected to the first end of said spring and said piston connected to the second end of said spring.

9. The clutch of claim 8 wherein the drive ring includes an axial flange having a slot directed axially toward the turbine, a flange welded to the turbine fitted within the slot, driveably connecting the turbine and the friction disc and permitting axial movement of the drive ring along the axis of rotation of the turbine relative to the turbine.

10. The clutch of claim 8 wherein the third friction surface is provided on an annular ring welded to the cover.

11. The clutch of claim 8 wherein the spring comprises a compression spring.

12. The clutch of claim 8 wherein the spring comprises a tension spring.

13. The clutch of claim 12 wherein the spring is in tension when the clutch is not engaged.

14. The clutch of claim 12 wherein the cover has an axis of rotation and the spring is oriented substantially perpendicular to said axis of rotation.

15. The clutch of claim 13 wherein the resilient connection of the spring comprises:

first and second hooks on the first and second ends of the spring, a flange on the annular ring for receiving the first end of the spring; and a flange on the piston for receiving the second end of the spring.

16. In an hydrokinetic torque converter that includes a cover, an impeller drivably connected to the cover and a turbine, a clutch for drivably releasing and locking the cover and turbine, comprising:

an annular piston drivably connected to the turbine having a first friction surface, an annular ring drivably connected to the cover having a second friction surface provided parallel the first surface, wherein said friction surfaces are engageable to provide a driving engagement therebetween; and a tension spring having first and second ends positioned between said piston and turbine to resiliently connect said piston and said cover, said ring connected to the first end of said spring; and said turbine connected to the second end of said spring.

17. The clutch of claim 16, further comprising a damping means between said piston and said cover.

18. The clutch of claim 17, wherein said cover has an axis of rotation and said spring is oriented generally perpendicular said axis of rotation.

19. In an hydrokinetic torque converter that includes a cover having an axis of rotation, an impeller drivably connected to the cover and a turbine, a clutch for drivably releasing and locking the cover and turbine, comprising:

an annular ring resiliently drivably connected to the cover having a first friction surface;

an annular piston drivably connected to the turbine having a second friction surface provided parallel the first surface, wherein said friction surfaces are engageable to provide a driving engagement therebetween;

a damping means between said ring and said cover; and a spring having first and second ends positioned between said piston and turbine resiliently connecting said piston to said turbine, said piston connected to the first end of said spring, and said turbine connected to the second end of said spring, said spring oriented generally perpendicular to the cover axis of rotation.

* * * * *